United States Patent [19]
Shimada et al.

[11] 4,430,292
[45] Feb. 7, 1984

[54] RADIOACTIVE GASEOUS WASTE DISPOSING SYSTEM

[75] Inventors: Hirofumi Shimada; Hisao Totsuka, both of Yokohama, Japan

[73] Assignee: Tokyo Shibaura Denki Kabushiki Kaisha, Kanagawa, Japan

[21] Appl. No.: 338,968

[22] Filed: Jan. 12, 1982

Related U.S. Application Data

[63] Continuation of Ser. No. 41,891, May 24, 1979, abandoned.

[30] Foreign Application Priority Data

Jun. 1, 1978 [JP] Japan ................................. 53-64941

[51] Int. Cl.³ .......................... G21C 19/32; B01J 9/02
[52] U.S. Cl. ..................................... 376/301; 423/580
[58] Field of Search ................. 376/300, 301; 423/580

[56] References Cited
U.S. PATENT DOCUMENTS 3,791,923 2/1974 Bhan ..................................... 376/300

FOREIGN PATENT DOCUMENTS 2922274 2/1980 Fed. Rep. of Germany ...... 376/301

Primary Examiner—Sal Cangialosi
Attorney, Agent, or Firm—Stevens, Davis, Miller & Mosher

[57] ABSTRACT

In a system for disposing radioactive gaseous wastes in a nuclear power plant including a steam turbine and a main condenser connected thereto, a recombining unit is connected to the main condenser and includes a preheater for heating the radioactive gaseous wastes fed from the main condenser to a predetermined temperature and a recombiner for recombining into water vapor oxygen and hydrogen contained in the radioactive gaseous wastes passing through the preheater. A condenser is connected to the recombining unit for cooling the recombined water vapor contained in the radioactive gaseous wastes into condensed water and a hold-up device connected to the condenser for adsorbing and holding up the radioactive gaseous wastes with an adsorbing agent. The waste gas is discharged from a stack connected to the holdup device into atmosphere.

1 Claim, 2 Drawing Figures

RADIOACTIVE GASEOUS WASTE DISPOSING SYSTEM

This is a continuation of application Ser. No. 41,891 filed May 24, 1979, now abandonded.

BACKGROUND OF THE INVENTION

This invention relates to an improvement of a system for disposing radioactive gaseous wastes in a nuclear power plant.

In a nuclear power plant, such as a lightwater type nuclear reactor, a portion of coolant, i.e. water, is decomposed into oxygen and hydrogen by the irradiation of neutrons during a time when the coolant passes through a reactor core. Simultaneously, radioactive isotopes such as $^3H$, $^{16}N$ and $^{19}O$ are generated and argon in a small amount of air contained in the cooling water also changes to radioactive isotopes of $^{37}Ar$ and $^{41}Ar$. These radioactive isotopes and mixed with steam and fed into a steam turbine system of the nuclear power plant. Therefore, it is necessary to maintain the safeness of the surroundings of the steam turbine system by providing a shielding equipment.

However, since the radioactive gaseous wastes discharged into the main condenser of the turbine system are generally non-condensable, they will stay at the upper portion thereof. The gaseous wastes staying at the upper portion of the main condenser are extracted to the outside of the turbine system by an air extractor and the extracted gaseous wastes are heated by steam generated by a boiler located in the power plant so as to recombine oxygen and hydrogen contained in the gaseous wastes in a recombiner. The recombined water vapour and the gaseous wastes are then fed into a condenser located downstream of the recombiner and cooled there by cooling water. The cooled vapour is liquefied into condensed water, separated from the gaseous wastes and returned to the main condenser. After separation of the vapour the gaseous wastes are sent to an adsorbing device utilizing an activated carbon through an attenuating pipe and a dryer in which radioactive wastes having short lifetime and moisture are fully removed. The remaining radioactive gaseous wastes mainly consisting of isotopes of Xe and Kr are adsorbed and held up for a long time by the activated carbon in the hold-up device. Thus, the gaseous wastes containing gases having radioactivity considerably lesser than a permissible radioactivity are discharged into atmosphere from a discharging stack.

In a conventional system, described above, for disposing radioactive gaseous wastes, it is necessary to provide pipes for connecting equipment such as a preheater, recombiner and a condenser which are independently located in the disposing system. These pipes are likely subjected to a stress caused by heat or earthquakes during the operation of the nuclear power plant and the stress acts on nozzles of the equipment as a reactive force. This stress or reactive force is undesirable for the equipment in the nuclear power plant.

In order to reduce the heat stress applied to the pipes, the pipes have been bent many times as far as possible to have sufficient flexibility, but this arrangement requires a number of pipe supporting members and a large space for installing the pipes and members. In addition, the use of long pipes for connecting the equipment of the power plant requires much work including the welding of the pipes in a field and the existence of the welded portions decreases the reliability of the equipment. Moreover, since a plurality of pipes are used, the temperature of the gaseous wastes once preheated by a preheater is lowered by the heat loss from the surfaces of the pipes, thereby decreasing the recombining effect between the oxygen and the hydrogen in the gaseous wastes. All defects described hereinabove are based on the fact that the various equipment in a radioactive gaseous waste disposing system are independently arranged and connected by a plurality of pipes.

SUMMARY OF THE INVENTION

An object of this invention is to provide an improved system for disposing radioactive gaseous wastes in a nuclear power plant having a recombining unit including a preheater and a recombiner which can eliminate pipes therebetween thereby making compact and simple the system.

Another object of this invention is to provide a condenser wherein radioactive gaseous wastes are in direct contact with cooling water for preventing radioactive waste gases from leaking to the outside of the system.

According to this invention these objects can be accomplished by providing a system for disposing radioactive gaseous wastes in a nuclear power plant including a steam turbine and a main condenser connected thereto of the type comprising a preheater connected to the main condenser for heating the radioactive gaseous wastes fed from the main condenser. a recombiner connected through a pipe to the preheater for recombining into water vapour oxygen and hydrogen contained in the heated radioactive gaseous wastes, a condenser connected to the recombiner for cooling the water vapour by cooling water, a hold-up device for adsorbing and holding up the radioactive gaseous wastes with an adsorbing agent, and a waste gas discharging stack connected to the hold-up device, and the system is characterized in that the preheater and the recombiner are assembled as a recombining unit without using any connecting pipe.

DESCRIPTION OF THE PREFERRED EMBODIMENT

Figure 1:
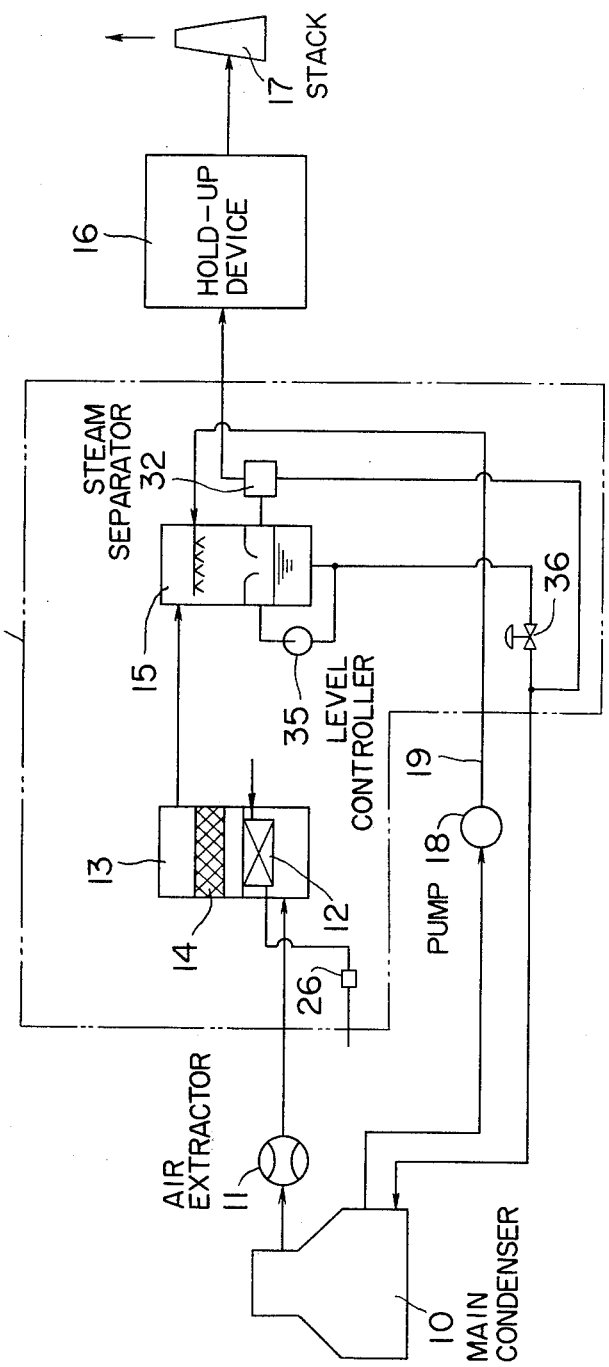
FIG. 1 shows a schematic view of one embodiment of a radioactive gaseous waste disposing system according to this invention.

Referring now to FIG. 1, a main condenser 10 is disposed downstream of a steam turbine, not shown, and an air extractor 11 is connected to the upper portion of the main condenser 10 to extract radioactive gaseous wastes staying in the upper portion thereof. The air extractor 11 is communicated with an inlet of a recombining unit 13 including a preheater 12 and a recombiner 14, which are aligned vertically with a slight space therebetween. The recombining unit 13 is usually a cylindrical container and is dividable into upper and lower halves at substantially the intermediate portion of the container 13 as shown by flanges 40 so that the recombiner 14 is disposed in the upper half and the preheater 12 in the lower half when the container 13 is disassembled. The preheater 12 serves to heat the gaseous wastes to a temperature suitable for effectively disposing of the wastes, and the preheated gaseous wastes passing through the preheater 12 is fed into the recombiner 14 in which the oxygen and the hydrogen in the gaseous wastes are recombined into vapour. A condenser 15 is connected to an outlet of the recombining unit 13 downstream thereof, and in the condenser 15, the recombined water vapour and steam from the turbine system for driving the air extractor 11 are cooled into condensed water. A device 16 for holding up the radioactive gaseous wastes with activated carbon is connected downstream of the condenser 15 for attenuating the radioactivity of the radioactive gaseous wastes to a level below a permissible radioactivity. The outlet of the hold-up device 16 is connected to gas discharging stack 17 for discharging the waste gas having substantially no radioactivity or a radioactivity below the permissible level into atmosphere.

A pipe line 19 is also arranged to feed cooling water from the main condenser 10 to the condenser 15 by means of a pump 18. Thus, the cooling water flows in a closed loop.

Figure 2:
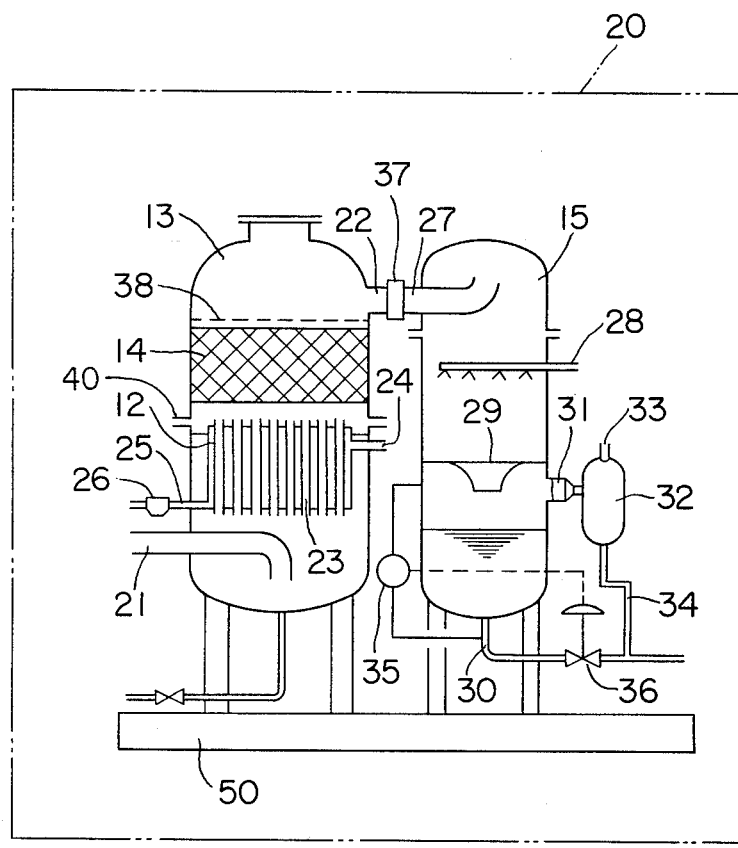
FIG. 2 shows an assembly including a recombining unit and a condenser shown in FIG. 1.

Referring now to FIG. 2 in which the condenser 15 and the recombining unit 13 are installed on a common skid 50 as one assembly 20. The recombining unit 13 essentially comprises an inlet pipe 21 through which the gaseous wastes from the main condenser 10 are introduced, the preheater 12, the recombiner 14, and an outlet pipe 22. The preheater 12 is of a shell and tube type heat exchanger and comprises a plurality of heat transfer tubes 23 which utilize steam flowing from an inlet pipe 21 towards an outlet pipe 25 as a heating medium. Usually a trap 26 is connected to the outlet pipe 25.

The outlet pipe 22 of the recombining unit 13 is connected to an inlet pipe 27 of the condenser 15 through an expansion joint 37. The condenser 15 comprises a cooling water injector 28, a baffle 29 located below the injector 28, an outlet pipe 30 disposed at the bottom of the condenser 15 for discharging condensed water and used cooling water, and a gaseous waste outlet pipe 31 on the side wall of the condenser 15. To the outlet pipe 31 is connected a steam separator 32 provided with a gaseous waste outlet pipe 33 at the upper end thereof and a drain duct 34 at the lower end thereof. Water level controlling means 35 which adjusts the water level of the condensed water and cooling water in the condenser 15 is installed in a by-pass line disposed at the lower portion of the condenser 15. A valve 36 for adjusting the flow of the condensed water from the condenser 15 is provided downstream of the outlet pipe 30.

In a case where a recombining unit of the type utilizing a catalyst is used, a wire net 38, shown in FIG. 2, may be provided within the recombining unit 13 for preventing the catalyst from dispersing towards the downstream side.

The radioactive gaseous waste disposing system according to this invention operates as follows.

The gaseous wastes passing through the air extractor 11 enters into the recombining unit 13 through the inlet pipe 21. The wastes are heated in the preheater 12 by steam fed through the steam inlet pipe 24 so as to efficiently combine the oxygen with the hydrogen in the gaseous wastes at a time when it is fed into the recombiner 14 without heat loss. The preheater 12 and the recombiner 14 are vertically aligned in the recombining unit 13 so that preheated gas flows directly upwardly to effectively contact the catalyst 38. The recombined water vapour and the gaseous wastes are then fed into the condenser 15 through the outlet pipe 22. The steam for heating the gaseous wastes enters into the outside of the heat transfer tubes 23 through the inlet pipe 24 and the steam transfers its heat to the gaseous wastes in the tubes 23. In this heat exchanging step, a portion of the steam changes into condensed water. The steam containing the condensed water flows out through the outlet pipe 25 and the condensed water is separated from the steam by the trap 26 and discharged to the outside of the system.

The cooling water fed from the main condenser 10 by means of the pump 18 for circulating the cooling water is injected through the injector 28 into the condenser 15 and cools the gaseous wastes in direct contact thereto, thereby condensing the water vapour contained in the gaseous wastes into the condensed water, which will be recovered into the main condenser 10. The heat transfer efficiency between the cooling water and the gaseous wastes in the condenser 15 will be increased by using a spraying device as the injector 28 which sprays the cooling water or by using a wire net or a flat plate for enlarging the area of contacting the cooling water to the gaseous wastes. The heat transfer efficiency attained by the direct contact, described above, can be considerably improved in comparison with the use of a conventional shell and tube heat exchanger. In addition, the preheater 12 can be made to be compact by directly contacting the gaseous wastes to the cooling water over a relatively wide area, and the latent heat of evaporation of the cooling water makes it possible to use a smaller quantity of cooling water than that in the conventional system. The condensed water obtained in the condenser 15 is returned to the main condenser 10 under a head similar to that in the conventional system. Thus, since the water in the main condenser 10 can be utilized as a cooling water, it is not necessary to supply the cooling water into the condenser 15 from an external source. The fact that the cooling water does not flow out of the waste disposing system efficiently prevents leakage of the cooling water having radioactivity to the outside of the system. Namely, in a case where the conventional shell and tube type heat exchanger is used as the condenser 15, if a portion of a pipe for supplying the cooling water were broken, the radioactive gaseous wastes would leak into the cooling water and the contaminated cooling water flows out of the system. However, according to the system of this invention, the possibility of the breaking of the pipe for supplying the cooling water is considerably low and even if the pipe were accidentally broken, the smaller amount of the contaminated cooling water flows into the main condenser 10 and does not flow out of the system.

Although the gaseous wastes also contain mist, it is caught by the steam separator 32 connected to the outlet pipe 31 of the condenser 15, and the gaseous wastes containing substantially no mist is fed into the hold-up device 16 for adsorbing the radioactive gaseous wastes with the activated carbon. The water level of the water containing the condensed water and the used cooling water in the condenser 15 is maintained at a predetermined level by level controlling means 35 and the level adjusting valve 36. It will of course be understood that although the steam separator 32, the water level control means 35, and the adjusting valve 36 were incorporated into the assembly 20 comprising the recombining unit 13 and the condenser 15 as shown in the embodiment of FIG. 2, it is possible to install them on the outside of the assembly 20.

According to the radioactive gaseous waste disposing system of this invention, a recombining unit and a condenser are installed on a common skid and combined as one assembly, so that the pipes connecting these equipment can be eliminated thereby making compact the system and minimizing the space for installation thereof. The constructional advantages allow workers to use a wide space for maintenance and operation of the system. The direct contact of the cooling water to the radioactive gaseous wastes in the condenser allows to use a small amount of the cooling water and prevents the wastes from leaking out of the system, thus providing the safe and reliable system. In addition, the elimination of the pipes necessary to connect respective equipments of the system makes simple the installation works in the field without connecting the pipes by welding, etc. Moreover, since the cylindrical containers are constructed to be dividable into two upper and lower parts so that the recombiner is disposed in the upper half and the preheater is disposed in the lower half when the recombining unit is disassembled, the periodical maintenance or inspection of the preheater and the recombiner can be performed independently, and these members are arranged vertically, so that the water vapour formed in the recombiner drops and does not stay there. Thus, if a catalyst is used, it will not be damaged by the water vapour.

I claim:

1. In a system for disposing of radioactive gaseous wastes in a nuclear power plant of the type comprising:
    a steam turbine;
    a first condenser connected to the steam turbine;
    a vertically cylindrical recombining unit connected to the first condenser and comprising preheating means for preheating to a predetermined temperature radioactive gaseous wastes fed from the first condenser and catalytic recombining means which forms water vapour from oxygen and hydrogen contained in the radioactive gaseous wastes;
    a second condenser connected to an output of said recombining unit; and
    means connected to an output of said second condenser for adsorbing and holding up the radioactive gaseous wastes with an adsorbing agent;
    the improvement in which said recombining unit is dividable into an upper half in which said recombining means is disposed and a lower half in which said preheating means is disposed, there being a space between said recombining means and said preheating means, said second condenser being disposed downstream of and in direct contact with said recombining unit, and in which the radioactive gaseous wastes are fed from said first condenser into said recombining unit at a portion of said recombining unit near the bottom thereof and pass through said preheating means, said recombining means, and into said second condenser through a portion of said recombining unit near its upper end.

* * * * *